Figure 1:
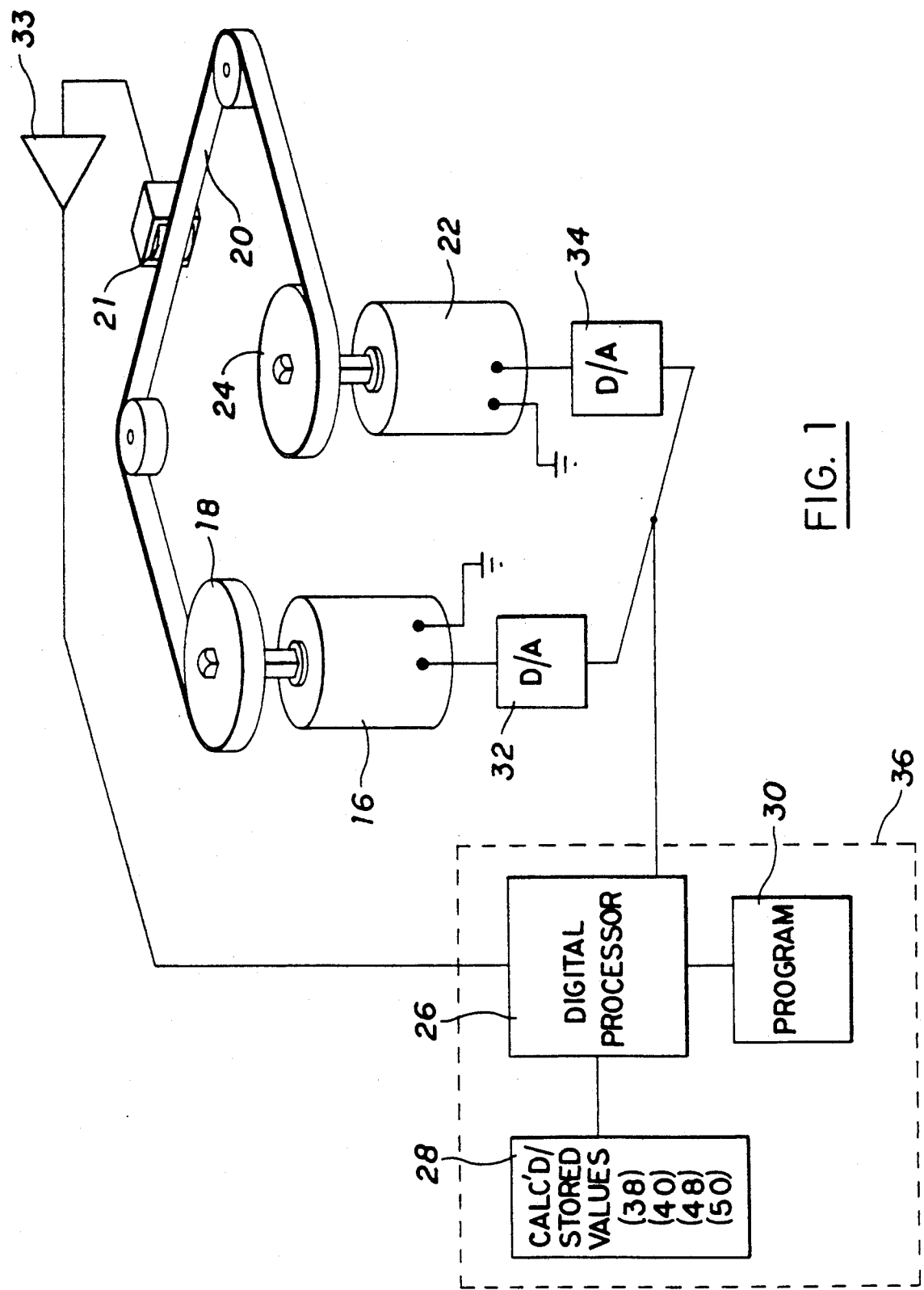

United States Patent [19]

Whyte, Jr. et al.

[11] Patent Number: 5,012,989
[45] Date of Patent: May 7, 1991

[54] APPARATUS AND METHOD FOR TAPE VELOCITY AND TENSION CONTROL IN A CAPSTANLESS MAGNETIC TAPE TRANSPORT

[75] Inventors: Robert E. Whyte, Jr., Encinitas; Ezra R. Alcudia, San Diego, both of Calif.

[73] Assignee: Eastman Kodak Company, Rochester, N.Y.

[21] Appl. No.: 440,932

[22] Filed: Nov. 24, 1989

[51] Int. Cl.$^5$ .................. G11B 15/32; B65H 59/38
[52] U.S. Cl. .......................... 242/186; 242/75.51; 242/203; 318/7; 360/73.14
[58] Field of Search .............. 242/283, 186, 187, 191, 242/75.51; 360/73.08, 73.09, 73.14; 318/6, 7

[56] References Cited

U.S. PATENT DOCUMENTS

| | | | |
|---|---|---|---|
| 4,256,996 | 3/1981 | Brooks et al. | 242/75.51 X |
| 4,400,745 | 8/1983 | Shu | 360/73.08 |
| 4,525,654 | 6/1985 | Tajima et al. | 242/75.51 X |
| 4,696,439 | 9/1987 | Sukigara et al. | 360/73.14 X |

Primary Examiner—John M. Jillions
Assistant Examiner—William G. Battista, Jr.
Attorney, Agent, or Firm—Dennis P. Monteith

[57] ABSTRACT

In a capstanless tape transport, practice of the invention provides substantially constant tape tension when tape is spooled from a supply reel to a take up reel over the tape's entire length, for either direction of tape travel. The tape velocity is maintained constant by a closed loop velocity servo controlling the current applied to one of the reeling motors, and the tape tension is maintained substantially uniform by applying a current derived in an open loop manner to the other motor, such that the sum of the currents to the two reeling motors equals a constant.

The invention may be implemented either utilizing analog control or digital control of the reeling apparatus.

5 Claims, 3 Drawing Sheets

APPARATUS AND METHOD FOR TAPE VELOCITY AND TENSION CONTROL IN A CAPSTANLESS MAGNETIC TAPE TRANSPORT

BACKGROUND OF THE INVENTION

1. Field of the Invention

This invention relates to a magnetic tape transport, and in particular, to control of the tape velocity and tension in a capstanless magnetic tape transport.

2. Description Relative to the Prior Art

It is well known in the magnetic recording art that tape velocity and tape tension are important parameters in the design of a magnetic tape transport. Constant tape velocity is essential in preservation of timing relations and frequency content in the recorded data. The importance of tension control arises from two conflicting considerations in transporting a magnetic tape across a magnetic record or playback head. First, a high enough tension must be maintained to insure intimate contact between the tape recording surface and the magnetic head to prevent the loss of signal due to spacing between the magnetic surface of the tape and the head. This spacing loss becomes increasingly severe with decrease in recorded wavelength, so the modern trend towards shorter and shorter recorded wavelengths requires extremely intimate head to tape contact. This may be accomplished by an adequate tape tension having a component forcing the tape into contact with the surface of the head. On the other hand, magnetic tape is invariably abrasive, and a high value of tape tension may result in unacceptable head wear as the tape is repeatedly shuttled over the head. The tape tension, therefore, must be established and maintained at a compromise value which satisfies both requirements. Unlike the requirement for constant tape velocity, there is latitude in one direction or the other in setting the tension to effect this compromise, and a variation of 10 to 15 percent from an optimal tension value is generally acceptable.

In the prior art transport utilizing a capstan for tape speed control, a variety of methods have been employed to provide the required tape tension. One means employs vacuum columns for the tape entering and leaving the capstan region. Each vacuum column is maintained at a reduced pressure such that the atmospheric pressure on the tape travelling through the column results in a force on the tape which sets the tension at a predetermined value. Another method employed in transports of the prior art uses rotatable spring loaded arms over which the tape passes. The arms are servo controlled to maintain a position such that the tension in the tape tending to rotate an arm in one direction is just balanced by the force exerted by the spring for rotation in the opposite direction.

The capstanless transport has also been disclosed in the prior art, where the velocity and the tension of the tape are set by control of the currents in the supply and take up motors. U.S. Pat. No. 4,256,996 issued in the names of Brooks et al discloses such a capstanless transport using an approximate calculated speed reference for controlling the tape velocity, and utilizing the specific torque-speed characteristics of the supply motor for control of the tension.

U.S. Pat. No. 4,400,745 in the name of Shu utilizes an algorithm that the tape tension in a velocity controlled capstanless transport may be maintained at a substantially uniform value by keeping the sum of the currents of the take up motor and the supply motor equal to a constant. If, for example, an increase in bearing friction in one of the reeling motors causes a decrease in tape velocity, the velocity servo will demand increased torque from the velocity servo controlled motor to restore the tape velocity. This in turn, requires an increase in the velocity servo motor current. As the tape accelerates, if the hold back torque, i.e. the current in the supply motor, is not correspondingly reduced, the tape tension will increase. This interaction of the motor currents acts to keep the tape tension constant. U.S. Pat. No. 4,400,745 implements this algorithm by incorporating two closed loop servos in a capstanless tape transport. One closed loop maintains the velocity of the tape equal to a preset value, and the second closed loop maintains the sum of the currents in the two motors equal to a pre-set constant current value. It will be noted that these two closed feedback loops are tightly coupled through the tape under tension, complicating the stabilization of the loops as the tape pack radius decreases on one reel while it is increasing on the other reel.

SUMMARY OF THE INVENTION

A single closed loop servo provides accurate velocity control in a capstanless transport, while the tension determining current of the supply motor, unlike the prior art, is controlled open loop such that the sum of the currents in the supply and take up motors is constant. The velocity control is accomplished in a closed loop manner by adding an error correction term, $\epsilon$, derived from the velocity servo, to an error-averaged current amount $I_a$, so the sum of the two terms, $I_a + \epsilon$, is the value of current used for controlling velocity. The value $I_a$ is derived by integrating earlier error values developed in the velocity servo loop. This technique of swinging the instantaneous error values about the average error value keeps the error correction values on scale. The value $I_a + \epsilon$ is converted to an analog current and is applied to drive the take up motor. Simultaneously, it is subtracted from a stored fixed current value $I_f$, to provide a signal $I_f - [I_a + \epsilon]$, which may be expressed $[I_f - I_a] - \epsilon$. This signal, converted to a current, is applied in an open loop manner to the supply motor which provides the hold back tension. It will be appreciated that the sum of the motor currents is effectively constant, because, as may be seen from the above expressions, a current change of $+\epsilon$ applied to one motor simultaneously results in a current change of $-\epsilon$ applied to the other motor. In this manner, the tape tension is maintained without the problem of stabilizing two tightly coupled separate closed loop servos.

DESCRIPTION OF THE INVENTION

In following the teaching of the invention, the tension magnitude is maintained at an optimal, essentially constant, value over the length of the full reel of tape for bi-directional operation of the transport. The invention may be implemented either in an analog form or digital form, with the digital implementation as the preferred embodiment.

Figure 2:
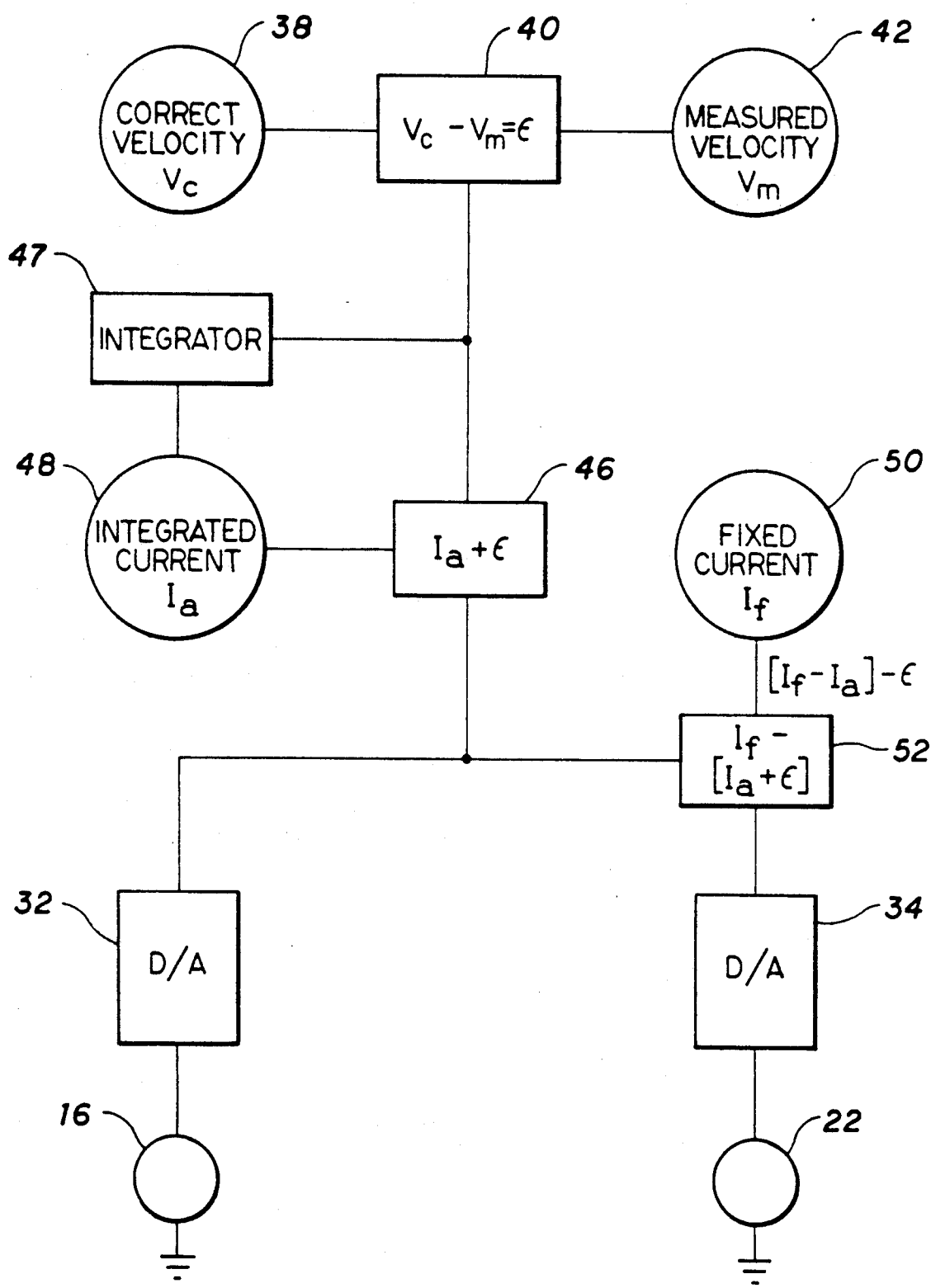
Figure 3:
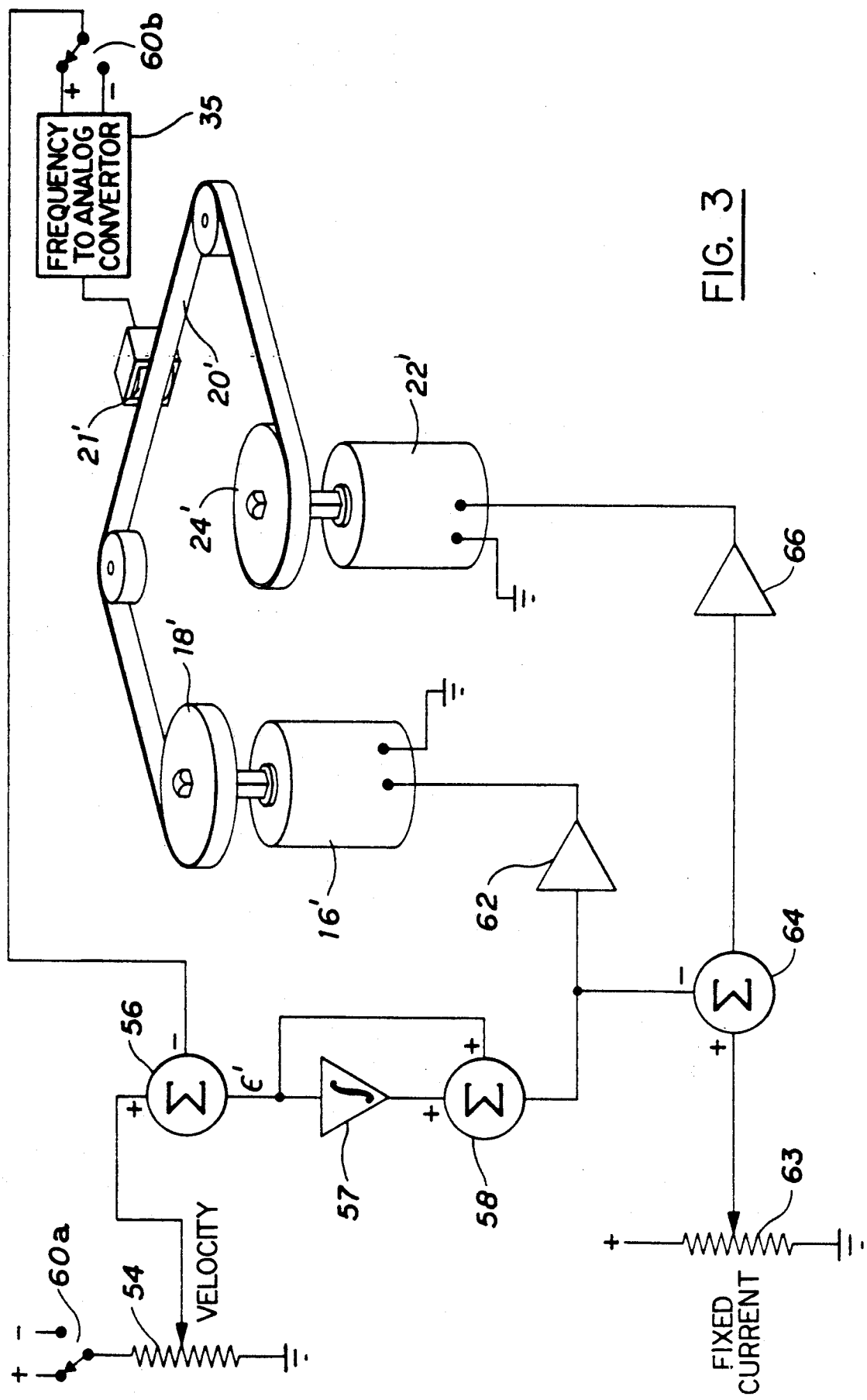

The invention will be described with respect to the figures, of which:

FIG. 1 is a schematic block diagram of a digital implementation of a capstanless tape transport reeling apparatus according to the invention, FIG. 2 is a flow diagram of steps executed in practice of the invention by means of the digital implementation or FIG. 1, and FIG. 3 is a schematic block diagram of an analog implementation of a capstanless tape transport reeling apparatus according to the invention.

Referring to FIG. 1, a digital processor 26, and associated memory 28 having stored or intermediately calculated values 38, 40, 48, 50 (See FIG. 2 for the identities of these reference numbers), and a stored program 30 (whose steps are shown in FIG. 2) feeds digital values to digital to analog converters 32, 34, which drive a d.c. take up motor 16 and a d.c. supply motor 22 respectively. (In a bi-directional transport, the terms "take up motor" and "supply motor" depend upon the direction of tape motion, and this description assumes the tape is running in the "forward" direction with the motor 16 as the take up and the motor 22 as the supply. The case of motion in the "reverse" direction is considered below. It is to be noted that the currents to the motors always provide oppositely directed torques, so the tape is always under tension.) Motor 16 is mechanically connected to a reel 18 and motor 22 is similarly connected to a reel 24 to move the tape 20 past a head 21. A playback signal, derived from uniformly recorded pulses, read from the tape 20 by the head 21 and amplified by an amplifier 33, occur at a frequency proportional to the tape 20 speed. The playback signal is converted to a measured velocity value 42 in the processor 26. The elements 26, 28, 30 contained within the dotted line 36, are available as a single microchip, such as the type 80C196KB 16 Bit High Performance CHMOS Microcontroller manufactured by Intel Corporation of Santa Clara, Ca.

Referring to FIG. 2, the measured tape velocity value 42 is subtracted 40 from a stored correct velocity value 38 providing a velocity error value $\epsilon$. The velocity errors $\epsilon$ are accumulated and applied to a digital integrator 47 to derive an average value of current $I_a$ 48, proportional to the integrated errors. It may be noted that the use of the integrator 47 is not essential for the practice of the invention; it is included in the preferred embodiment as a scaling feature. When an instantaneous velocity error $\epsilon$ occurs, the sum 46 of the error $\epsilon$ and the average $I_a$ 48 is applied to the digital to analog converter 32 which provides the current drive to the take up motor 16. Simultaneously, the sum $I_a + \epsilon$ 46 is subtracted 52 from a stored fixed current value $I_f$ 50 resulting in a value $[I_f - I_a] - \epsilon$ applied to the digital to analog converter 34 providing the open loop drive current to the supply motor 22. It will be appreciated that the sum, $(I_a + \epsilon + I_f - I_a - \epsilon = I_f)$, of the digital inputs to the digital to analog converters 32, 34, and therefore, the sum of the motor currents is constant and equal to $I_f$, in accordance with the teaching of the invention. As a specific example, under steady state conditions, (no velocity error, no acceleration, $\epsilon = 0$) and at equal tape pack radii, it may be seen from symmetry considerations that for constant tension, the current in both motors will be identical and therefore equal to $I_f/2$, with a resultant sum of $I_f$.

To effect bi-directional operation, the tape velocity and the velocity error are regarded as vectorial quantities having a sign as well as a magnitude. In the arbitrarily defined "forward" motion described above, the correct velocity 38 and the measured velocity 42 are considered to have positive signs. Under these conditions, if the tape is running too fast the sign of the error $\epsilon$, as derived by the steps of FIG. 2 in the digital processor 26, is negative, and if the tape is running too slow, the sign of the error $\epsilon$ is positive. When the tape is running in the "reverse" direction, the correct velocity 38 and the measured velocity 42 are assigned negative signs by the digital processor 26, and under the same program steps performed in the digital processor 26 for the "forward" direction, if the tape is running too fast the sign of the error $\epsilon$ is now positive, and if the tape is running too slow the sign of the error is now negative. Because the motor torques are proportional to the applied currents which increase and decrease depending upon the sign and magnitude of the error $\epsilon$, it will be appreciated that the interchange of the sign of the error signal when the direction of tape motion is reversed, effectively interchanges the roles of the motors from "take up" to "supply" depending upon tape direction.

Referring to FIG. 3, in an analog implementation of the invention, a take up motor 16' is mechanically coupled to a take up reel 18'. A magnetic tape 20', feeds from a supply reel 24' which is coupled to a d.c. supply motor 22'. (In the drawings, different but related elements are identified with the same reference characters, albeit that corresponding elements in the various drawings are distinguished by the use of primes.) A closed loop velocity servo whose reference voltage establishes the tape 20' velocity is set by a potentiometer 54. The feedback tape velocity may be determined by one of a variety of techniques known in the art, such as monitoring the rotational velocity of the take up reel 18' and the radius of the tape pack on the reel 18' to allow calculation of the tape 20' velocity. The method utilized in FIG. 1 which uses equi-spaced prerecorded pulses on the tape 20' may also be employed in the analog implementation. When these pulses are read by a playback head 21', a feedback signal whose frequency is directly proportional to tape velocity is derived. This played back signal is converted to a voltage in a frequency to analog converter 35, and the voltage is subtracted from the velocity reference voltage set by potentiometer 54 in an adder 56. The resultant error voltage $\epsilon'$ is applied to an integrator 57 (known and available in the art) whose output is added back to the error $\epsilon'$ in the adder 58. This signal is applied to the input of the amplifier 62. The amplifier 62 drives the take up motor 16'. The output from the adder 58 is also subtracted in the adder 64 from the fixed current value set by potentiometer 63. The output from the adder 64 is fed to the input of the amplifier 66. The output of the amplifier 66 drives the supply motor 22'. It will be seen that the current in the take up motor 16' is proportional to the output of the adder 58 $I_a' + \epsilon'$. The current in the supply motor is proportional to the output of the adder 64, $[I_f' - I_a'] - \epsilon'$, and, therefore, the sum of the motor currents are substantially constant, as in the digital implementation. When tape direction is reversed, a switch having contacts $60_a$, $60_b$ is positioned so that the voltage applied to the velocity reference potentiometer, 54, is negative, and a negative output is taken from the frequency to analog converter 35 through the contact $60_b$. This interchanges the roles of the take up and supply motors in a manner completely analogous to the digital case as previously described.

The invention has been described in detail with particular reference to preferred embodiments thereof, but it will be understood that variations and modifications can be effected within the spirit and scope of the invention. The teachings of the invention are readily applicable either to a reel to reel transport or to a cartridge loaded transport.

What is claimed is:

1. A capstanless transport apparatus for spooling a web of magnetic tape from a first reel to a second reel, said web having a span of said tape extending between said reels, said apparatus further comprising:
   a. a first reeling motor responsive to the flow of a first current therein for rotatably driving said first reel,
   b. a second reeling motor responsive to the flow of a second current flow therein for rotatably driving said second reel,
   c. first servo means operated in a closed loop configuration for controlling said first reeling motor to cause the span of tape to be transported at a controlled speed, and
   d. second servo means, operated in an open loop configuration and responsive to the magnitude of the first current supplied to said first reeling motor, for controlling said second reeling motor with the aforementioned second current to regulate tape tension, the sum of the first current and the second current being substantially constant.

2. The apparatus of claim 1 wherein said first servo means includes integrator means for integrating tape speed error.

3. The apparatus of claim 1 wherein said first reeling motor is a take up motor of said apparatus when the tape is transported in a first forward direction, and said first reeling motor is a supply motor when the tape is transported in a second reverse direction.

4. The apparatus of claim 1 wherein the first current and the second current are d.c. currents.

5. The apparatus of claim 1 wherein the first reel and the second reel are rotatably mounted in a tape cartridge.

* * * * *